US008867791B2

(12) United States Patent
Chen et al.

(10) Patent No.: US 8,867,791 B2
(45) Date of Patent: *Oct. 21, 2014

(54) GESTURE RECOGNITION METHOD AND INTERACTIVE SYSTEM USING THE SAME (71) Applicant: Pixart Imaging Inc., Hsin-Chu County (TW)

(72) Inventors: Hsin-Chia Chen, Santa Clara, CA (US); Tzung-Min Su, Hsin-Chu (TW)

(73) Assignee: Pixart Imaging Inc., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/181,055

(22) Filed: Feb. 14, 2014

(65) Prior Publication Data

US 2014/0160053 A1    Jun. 12, 2014

Related U.S. Application Data (63) Continuation of application No. 12/870,290, filed on Aug. 27, 2010, now Pat. No. 8,675,913.

(30) Foreign Application Priority Data

Sep. 2, 2009   (TW) .............................. 98129508 A (51) Int. Cl.
*G06K 9/00*   (2006.01)
*G06F 3/01*   (2006.01)

(52) U.S. Cl.
CPC ..................................... *G06F 3/017* (2013.01)
USPC ............................ 382/103; 345/175; 715/863

(58) Field of Classification Search
USPC .......... 382/100, 103; 345/156–158, 173–175; 715/863
See application file for complete search history.

(56) References Cited

U.S. PATENT DOCUMENTS

| 6,972,401 | B2 | 12/2005 | Akitt et al. |
| 7,411,575 | B2 | 8/2008 | Hill et al. |
| 8,493,341 | B2 | 7/2013 | Huang et al. |
| 2003/0071858 | A1 | 4/2003 | Morohoshi |
| 2005/0078852 | A1 | 4/2005 | Buehler |
| 2006/0010400 | A1 | 1/2006 | Dehlin et al. |
| 2009/0044988 | A1 | 2/2009 | Chang et al. |
| 2010/0201639 | A1 | 8/2010 | Huang et al. |
| 2011/0052007 | A1 | 3/2011 | Chen et al. |
| 2011/0291988 | A1 | 12/2011 | Bamji et al. |
| 2012/0013529 | A1 | 1/2012 | McGibney et al. |

*Primary Examiner* — Aaron W Carter
(74) *Attorney, Agent, or Firm* — Lowe Hauptman & Ham, LLP (57) ABSTRACT A gesture recognition method for an interactive system includes the steps of: capturing image windows with an image sensor; obtaining information of object images associated with at least one pointer in the image windows; calculating a position coordinate of the pointer relative to the interactive system according to the position of the object images in the image windows when a single pointer is identified according to the information of object images; and performing gesture recognition according to a relation between the object images in the image window when a plurality of pointers are identified according to the information of object images. The present invention further provides an interactive system.

14 Claims, 10 Drawing Sheets

FIG.7f ns of the touch points cannot be figured out due to the hiding of the pointers between each other.

The interactive system of the present invention includes at least one light source, a reflector and an image sensor configured to capture an image window comprising object images of at least one pointer caused by that the pointer occludes the light emitting from the light source and/or the reflector. The gesture recognition method comprises the steps of: capturing an image window with the image sensor; obtaining information of the object images in the image window; identifying whether there is a plurality of pointers present according to the information of the object images; and executing a gesture recognition according to a relation between the object images in the successive image windows when a plurality of pointers are identified.

According to the gesture recognition method of the present invention, wherein the information of the object images comprises an average number of the object images, an average distance between the object images and a greatest distance between the object images.

According to the gesture recognition method of the present invention, wherein the step of executing a gesture recognition according to a relation between the object images in the successive image windows further comprises: comparing the average number of the object images and the average distance between the object images with a threshold value; executing a gesture recognition of up, down, left, right, zoom in or zoom out when the average number of the object images or the average distance between the object images is smaller than the threshold value; executing a gesture recognition of rotation when the average number of the object images or the average distance between the object images is greater than the threshold value; and refreshing the display of an image display according to the recognized gesture.

The present invention further provides an interactive system. The interactive system includes a light-emitting unit, an image sensor and a processing unit. The image sensor is configured to capture image windows each comprising object images of at least one pointer caused by that the pointer occludes the light emitting from the light-emitting unit. The processing unit is configured to execute gesture recognition according to a relation between the object images in the successive image windows captured by the image sensor.

According to the interactive system of the present invention, wherein the light-emitting unit is an active light source or a passive light source. When the light-emitting unit is a passive light source, the light-emitting unit has a reflecting surface and the interactive system further comprises an active light source.

The present invention further provides a gesture recognition method for an interactive system. The interactive system includes a light-emitting unit and an image sensor configured to capture an image window comprising object images of a plurality of pointers caused by that the pointers occlude the light emitting from the light-emitting unit. The gesture recognition method comprising the steps of: capturing image windows with the image sensor; and executing a gesture recognition according to relations between a plurality of object images in the successive image windows.

According to the gesture recognition method of the present invention, wherein the relations between the object images comprise a change of an average distance between the object images, a change of a greatest distance between the object images and a direction of displacement.

According to the gesture recognition method and the interactive system of the present invention, wherein the interactive system controls the motion of a cursor according to the

GESTURE RECOGNITION METHOD AND INTERACTIVE SYSTEM USING THE SAME

CROSS REFERENCE TO RELATED APPLICATION

This application is a continuation application of U.S. application Ser. No. 12/870,290, filed on Aug. 27, 2010, the disclosure of which is hereby incorporated by reference herein in its entirety. This application claims the priority benefit of Taiwan Patent Application Serial Number 098129508 filed Sep. 2, 2009, the full disclosure of which is incorporated herein by reference.

BACKGROUND OF THE INVENTION

1. Field of the Invention

The present invention relates to an interactive system, and more particularly, to a gesture recognition method and interactive system using the same.

2. Description of the Related Art

Figure 1:
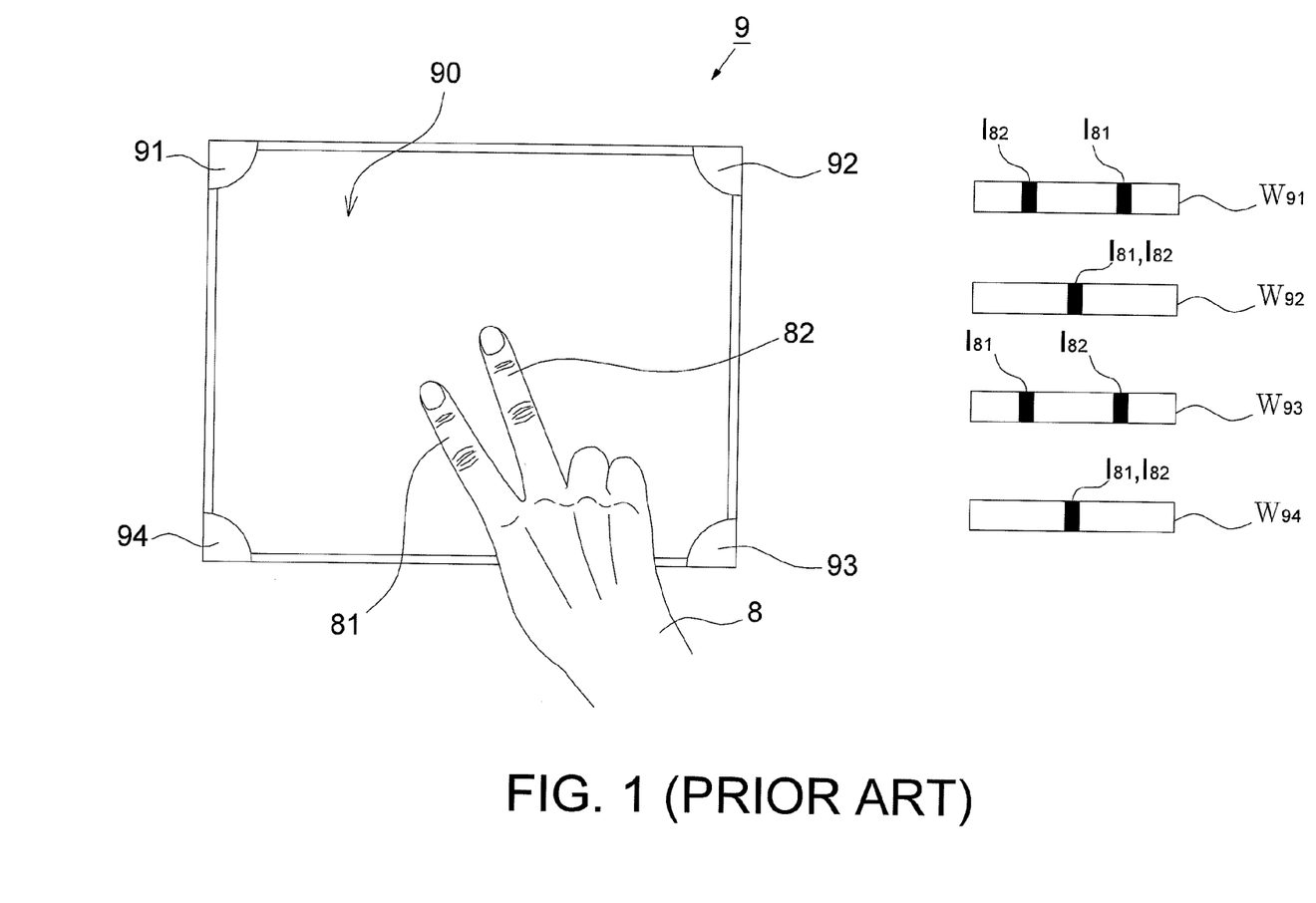
FIG. 1 is a schematic view of a conventional touch system.

Referring to FIG. 1, it illustrates a conventional touch system 9. The touch system 9 includes a touch surface 90 and at least two cameras 91 and 92. The touch surface 90 locates within the fields of view of the cameras 91, 92. When a user touches the touch surface 90 with his one finger, the cameras 91, 92 will capture image windows that comprise the object images of the tip of the finger. A processing unit calculates the two-dimensional position coordinate of the touch point on the touch surface 90 according to the positions of the object images of the finger tip in the image windows and then enables a display to execute corresponding actions according to the change of the two-dimensional position coordinates.

The touch system 9 obtains the two-dimensional position coordinate of the touch point on the touch surface 90 according to the positions of the object images of the finger tip in the image windows. However, when a user touches the touch surface 90 with several fingers, these fingers may occlude each other from the view of the camera 92. Therefore, the image window captured by the camera 92 may not always contain all the object images of the tips of the fingers.

For example, referring to FIG. 1, when a user touches the touch surface 90 with his fingers 81 and 82, the camera 91 will capture an image window $W_{91}$ that contains the object image $I_{81}$ of the finger 81 and the object image $I_{82}$ of the finger 82. However, because the finger 82 occludes the finger 81 from the view of the camera 92, the image window $W_{92}$ captured by the camera 92 will contain only one object image. Therefore, the processing unit will obtain wrong two-dimensional position coordinates of the touch points in the image windows according to the image windows $W_{91}$ and $W_{92}$. This can cause an incorrect response.

In order to solve the above problem, two cameras 93 and 94 can be further arranged at other two corners to capture two other image windows $W_{93}$ and $W_{94}$. The processing unit can obtain the two-dimensional position coordinates of the touch points on the touch surface 92 on which the fingers 81 and 82 touch. However, this will increase the cost of the system.

SUMMARY OF THE INVENTION

The present invention provides a gesture recognition method and the interactive system using the same that identifies the relation between the object images in an image window captured by an image sensor to perform gesture recognitions. This can solve the prior-art problem that posichange of the two-dimensional position coordinates of a pointer at the first mode. At the second mode, the interactive system refreshes the display of an image display according to the relations between the object images of a plurality of pointers. For example, the image display can be operated to scroll screen, scale object, rotate object, switch display or show menu.

According to the gesture recognition method and the interactive system of the present invention, the gesture can be recognized there is no need to calculate the coordinates of the touch points of a plurality of pointers. Therefore, the gesture recognition can still be made when the pointers occlude each other in view of the image sensor.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 3b is a schematic view of an image window captured by the image sensor in FIG. 3a.

FIG. 4b illustrates a flow chart of executing the second mode in FIG. 4a.

FIGS. 6b and 6c are schematic views of image windows captured by the image sensors in FIG. 6a.

DETAILED DESCRIPTION OF THE PREFERRED EMBODIMENT

The foregoing, as well as additional objects, features and advantages of the invention will be more readily apparent from the following detailed description, which proceeds with reference to the accompanying drawings. In this invention, identical reference numerals will be used when designating substantially identical elements that are common to the figures.

Figure 2A:
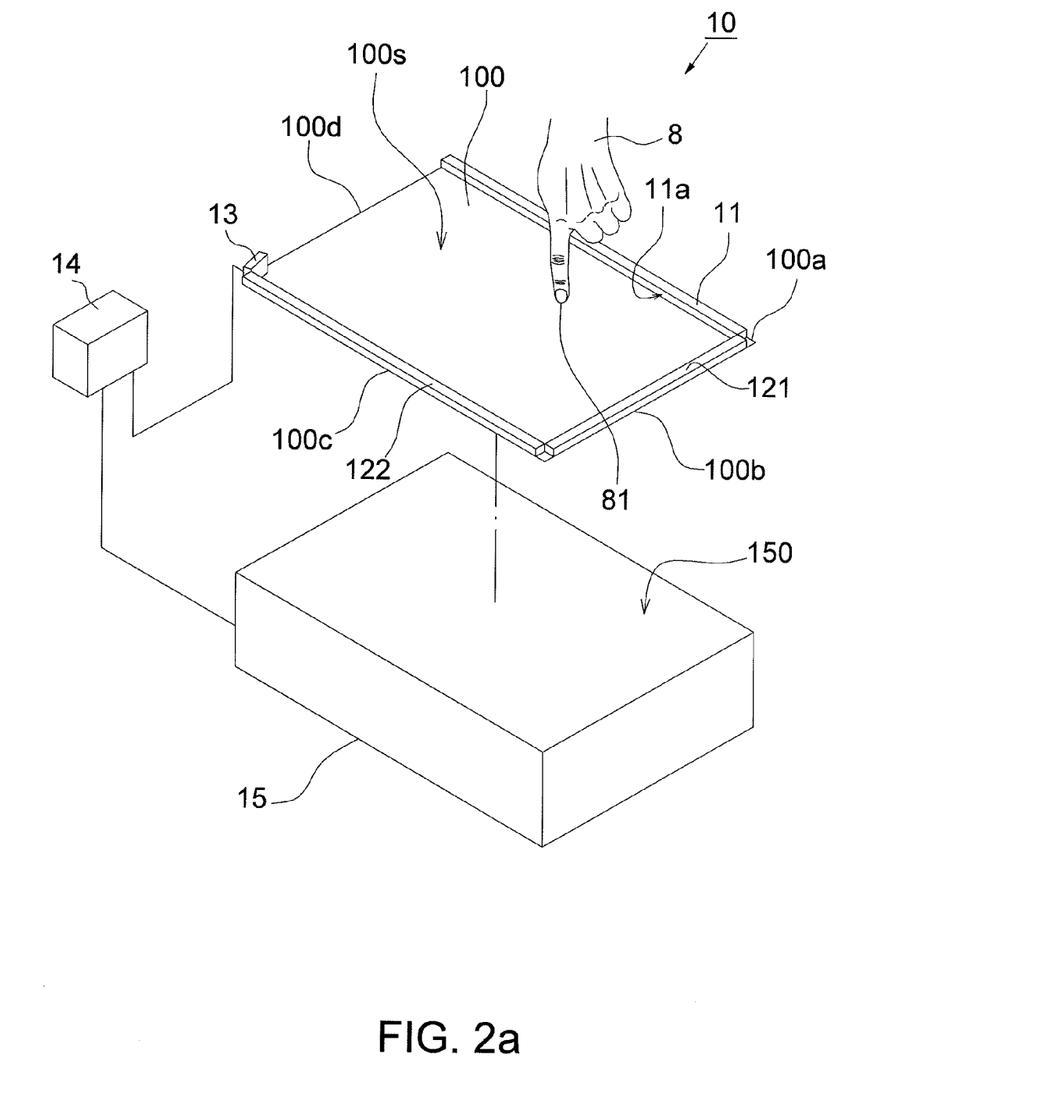
FIG. 2a is a perspective view of the interactive system according to the embodiment of the present invention.
Figure 2B:
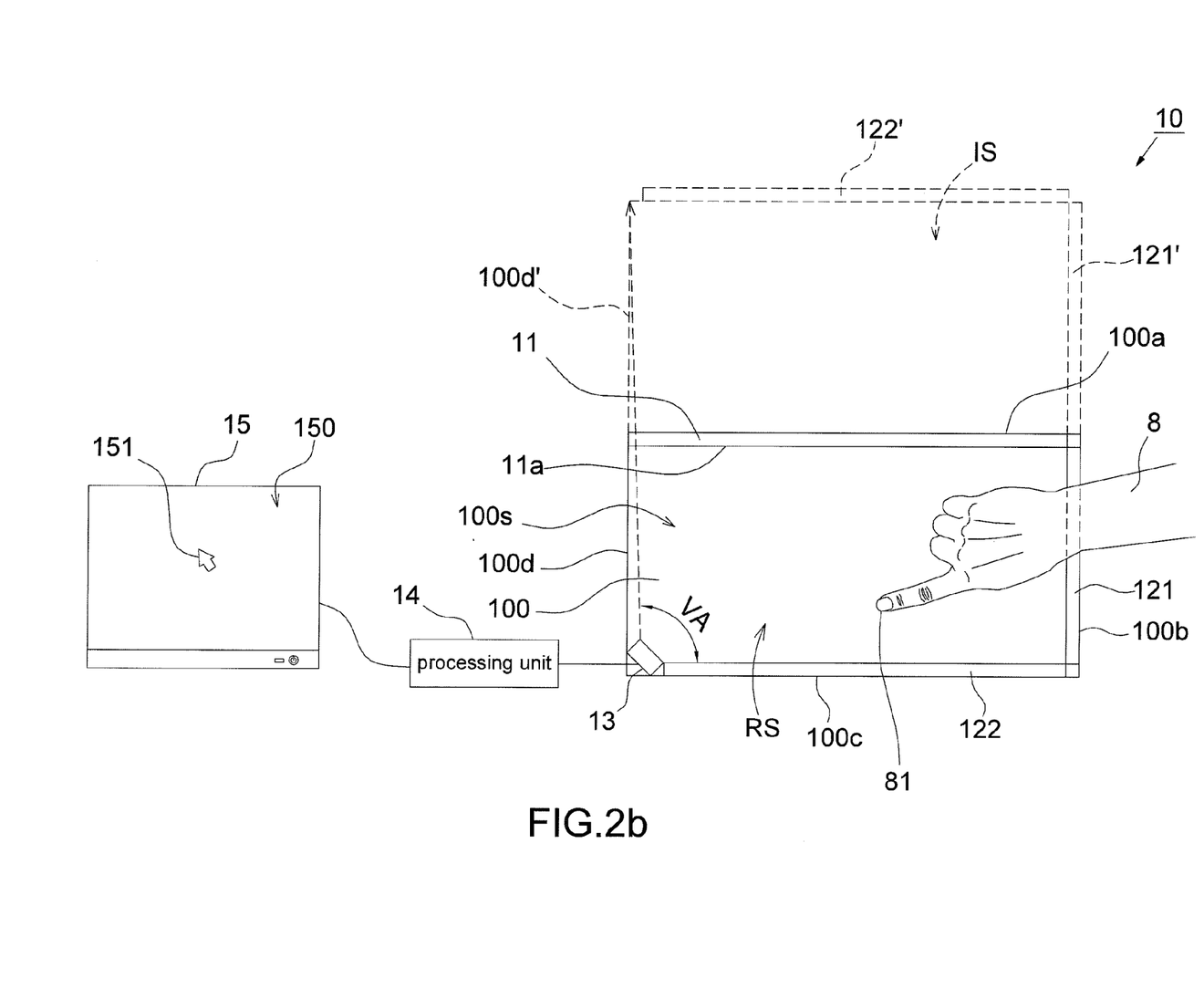
FIG. 2b is an operational schematic view of the interactive system according to the first embodiment of the present invention.

Referring to both FIGS. 2a and 2b, wherein FIG. 2a is a perspective view of the interactive system 10 according to the first embodiment of the present invention and FIG. 2b is a schematic view illustrating how to operate the interactive system 10. The interactive system 10 includes a panel 100, a light-emitting unit 11, a first light source 121, a second light source 122, an image sensor 13, a processing unit 14 and an image display 15.

The panel 100 has a first side 100a, a second side 100b, a third side 100c, a fourth side 100d and a surface 100s. The panel 100 can be, but not limited to, a whiteboard or a touch screen. The light-emitting unit 11 is disposed on the surface 100s and adjacent to the first side 100a. The light-emitting unit 11 can be an active light source or a passive light source. When the light-emitting unit 11 is an active light source, it can generate light and preferably is a line light source. When the light-emitting unit 11 is a passive light source, it can reflect the light emitting from other light sources (e.g. first light source 121 or second light source 122). The passive light source 11 includes a reflecting surface 11a facing the third side 100c of the panel, wherein reflecting surface 11a is made of a suitable material. The first light source 121 is disposed on the surface 100s and adjacent to the second side 100b. Preferably, the first light source 121 emits light toward the fourth side 100d. The second light source 122 is disposed on the surface 100s and adjacent to the third side 100c. Preferably, the second light source 122 emits light toward the first side 100a. The first and second light sources 121, 122 preferably are active light sources, for example, line light sources.

Referring to FIG. 2b again, when the light-emitting unit 11 is a passive light source (e.g. a reflector), the first light source 121 can mirror a second mirror image 121' on the reflecting surface 11a, the second light source 122 can mirror a third mirror image 122' on the reflecting surface 11a, and the fourth side 100d of the panel 100 can mirror a fourth mirror image 100d' on the reflecting surface 11a. The light-emitting unit 11, the first light source 121, the second light source 122 and the fourth side 100d of the panel 100 together define a real-image space RS. The light-emitting unit 11, the second mirror image 121', the third mirror image 122' and the fourth mirror image 100d' together define an imaginary-image space IS.

The image sensor 13 is arranged at one of the corners of the panel 100. In this embodiment, the image sensor 13 is arranged at the intersection of the third and fourth sides 100c, 100d of the panel 100. The image sensor 13 has a field of view VA that covers at least the real-image space RS and the imaginary-image space IS so as to capture the image windows of the real-image space RS and imaginary-image space IS, and the object image of a pointer 81, e.g. a finger in the real-image space RS. In one embodiment, the image sensor 13 includes a lens (or a lens set) to configure to adjust the range of the field of view VA of the image sensor 13 so that the image sensor 13 can capture the object images of the whole real-image space RS and imaginary-image space IS. The image sensor 13 can be, but not limited to, a CCD image sensor or CMOS image sensor.

The processing unit 14 is coupled to the image sensor 13 to process the images captured by the image sensor 13 so as to recognize one or more pointers. When only one pointer is identified, the processing unit 14 calculates the two-dimensional position coordinate of the touch point on the panel surface 100s on which the pointer touches according to the position of the object image of the pointer in the image window. When a plurality of pointers are identified, the processing unit 14 can make gesture recognition according to the relation between the object images of the pointers in the image window and then enables an image display to refresh the display screen according to the recognized gesture. The recognition method will be described in detail in the following paragraphs.

The image display 15 is coupled to the processing unit 14. The image display 15 includes a display screen 150 that can show a cursor 151 thereon, as shown in FIG. 2*b*. The processing unit 14 can then relatively control the motion of the cursor 151 on the display screen 150 according to the change of the calculated two-dimensional position coordinates of the touch points on the panel surface 100*s* on which the pointers touch. In addition, the processing unit 14 can also refresh the display of the display screen 150 according to the relation between the object images of the pointers in the captured image window. For example, the display screen 150 can be operated to scroll screen, scale object, rotate object, switch display or show menu.

In order to easily illustrate the interactive system of the present invention, the panel 100 is separated from the image display 15. However, it will be appreciated that the panel 100 can also be attached to the display screen 150 of the image display 15 in other embodiments. In addition, when the panel 100 is a touch screen, the display screen 150 of the image display 15 can be functioned as the panel 100. The light-emitting unit 11, first light source 121, second light source 122 and image sensor 13 will be positioned on the display screen 150.

It should be understood that although the panel 100 is rectangular and the light-emitting unit 11, first light source 121 and second light source 122 are arranged perpendicularly to each other on the sides of the panel 100 shown in FIGS. 2*a* and 2*b*, these arrangements are only one of the embodiment according to the present invention. In other embodiments, the panel 100 can be of another shape and the light-emitting unit 11, first light source 121, second light source 122 and image sensor 13 can be positioned in other arrangements. The spirit of the present invention is that the image sensor 13 is configured to capture an image window and the processing unit 14 executes gesture recognition according to the displacements of the object images and the relation between the object images in the image window. The processing unit 14 then refreshes the display of the display screen according to the recognized gesture.

First Embodiment

Figure 3A:
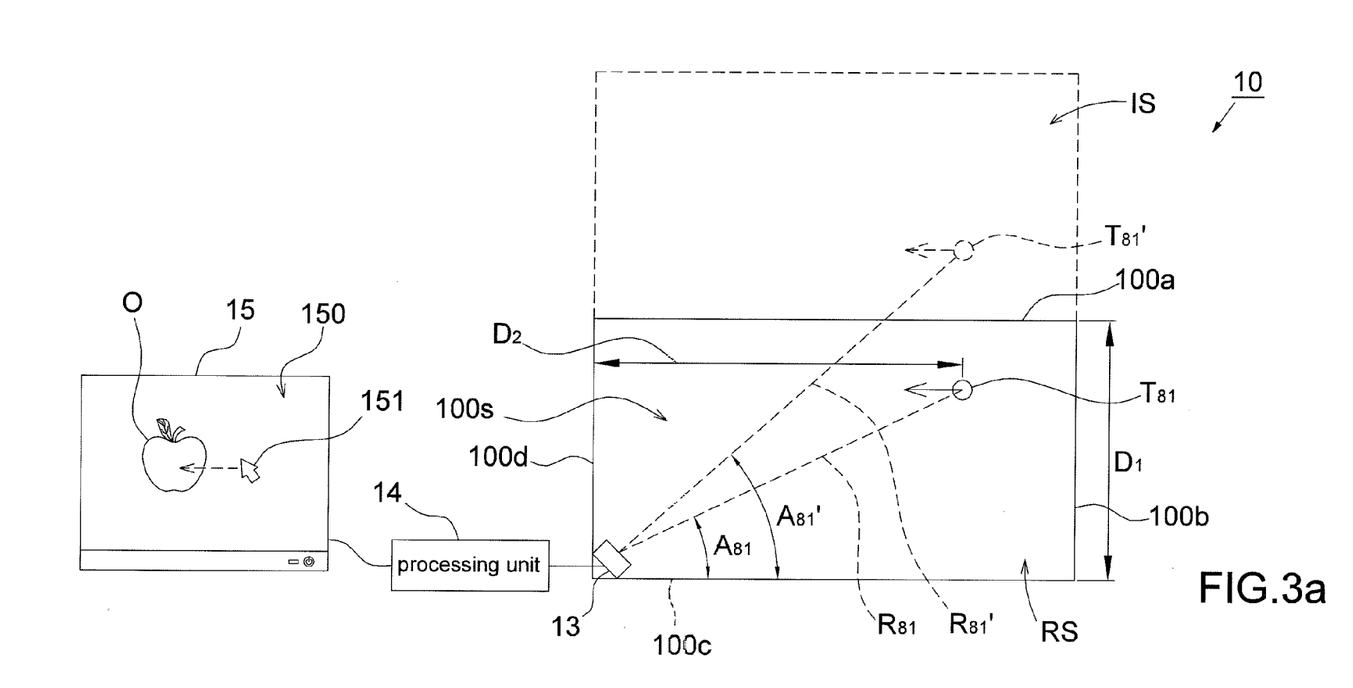
FIG. 3a is a schematic view illustrating that the interactive system according to the first embodiment of the present invention is used to control a cursor.
Figure 3B:
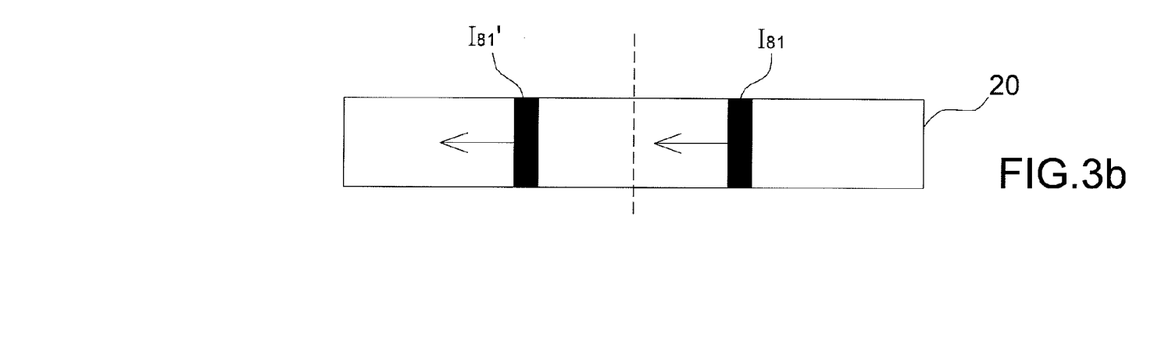

Referring to both FIGS. 3*a* and 3*b*, wherein FIG. 3*a* is a schematic view illustrating that the interactive system 10 according to the first embodiment of the present invention is used to control a cursor and FIG. 3*b* is a schematic view of an image window 20 captured by the image sensor 13 in FIG. 3*a*. As shown in the figure, when a pointer, for example, a finger 81 touches on a point $T_{81}$ on the panel surface 100*s* in the real-image space RS, a first mirror image of the pointer is mirrored on the reflecting surface 11*a* of the light-emitting unit 11 in the imaginary-image space IS. Therefore, the touch point $T_{81}$ has a mirror touch point $T_{81}'$ in the imaginary-image space IS. The image sensor 13 captures an image of the tip of the pointer according to a first sensing route $R_{81}$ so as to form a first object image $I_{81}$ in the image window 20. Similarly, the image sensor 13 captures an image of the tip of the first mirror image of the pointer according to a second sensing route $R_{81}'$ so as to form a second object image $I_{81}'$ in the image window 20. In this embodiment, the information of the one-dimensional position of a object image in the image window 20 and the angle between a sensing route and the third side 100*c* of the panel 100 has been stored in the processing unit 14 in advance. Therefore, when the image sensor 13 captures the object images of the tips of the pointer and the first mirror image to form the image window 20, the processing unit 14 can obtain a first angle $A_{81}$ and a second angle $A_{81}'$ respectively according to the one-dimension positions of the object images in the image window 20. Afterward, the processing unit 14 can then obtain the two-dimensional position coordinate of the touch point $T_{81}$ on the panel surface 100*s* according to the trigonometry.

For example, in one embodiment, the panel surface 100*s* constitutes a Cartesian coordinate system. The third side 100*c* is the x-axis of the Cartesian coordinate, the four side 100*d* is the y-axis of the Cartesian coordinate and the position of the image sensor 13 is the origin. Therefore, the x-coordinate value of the touch point $T_{81}$ will be represented by the least distance from the touch point $T_{81}$ to the four side 100*d* and the y-coordinate value will be represented by the least distance from the touch point $T_{81}$ to the third side 100*c*. In addition, the information about the distance $D_1$ between the first side 100*a* and third side 100*c* has been pre-stored in the processing unit 14. In this manner, the processing unit 14 can obtain the two-dimensional position coordinate of the touch point $T_{81}$ according to the following steps. (a) The processing unit 14 obtains the first angle $A_{81}$ between the first sensing route $R_{81}$ and the third side 100*c* of the panel 100 and the second angle $A_{81}'$ between the second sensing route $R_{81}'$ and the third side 100*c* of the panel 100. (b) The distance $D_2$ from the touch point $T_{81}$ to the fourth side 100*d* of the panel 100 can be then obtained according to the equation $D_2 = 2D_1/(\tan A_{81} + \tan A_{81}')$. (c) The y-coordinate value of the touch point $T_{81}$ will be represented by $D_2 \times \tan A_{81}$. Accordingly, the two-dimensional coordinate of the touch point $T_{81}$ can be expressed as $(D_2, D_2 \times \tan A_{81})$.

Referring to FIGS. 3*a* and 3*b* again, the interactive system 10 according to the first embodiment of the present invention has two operation modes. When the processing unit 14 identifies that only one pointer touches the panel surface 100*s* according to the image window 20 captured by the image sensor 13, the interactive system 10 is operated at the first mode. At the first mode, the image sensor 13 continuously captures images at a sampling frequency and then the processing unit 14 calculates the two-dimensional position coordinate of the touch point $T_{81}$ on the panel surface 100*s* on which the pointer touches according to one-dimensional positions of the object images of the pointer in the image windows 20. Afterward, the processing unit 14 relatively controls the motion of the cursor 151 on the display screen 150 according to the change of the two-dimensional position coordinates of the touch point $T_{81}$. For example, the pointer 81 moves toward the four side 100*d* of the panel 100, the touch point $T_{81}'$ of the first mirror image will move toward the fourth mirror image 100*d'* accordingly. At this moment, the image $I_{81}$ of the pointer in the image window 20 and the image $I_{81}'$ of the first mirror image will also move toward the left side of the image window 20. In this manner the processing unit 14 can calculate the two-dimensional position coordinate of the touch point $T_{81}$ according to the positions of the object images $I_{81}$ and $I_{81}'$ in each the image window 20 and then move the cursor 151 on the display screen 150 toward the left side of the image display 15 according to the change of the two-dimensional position coordinates of the touch point $T_{81}$. It should be understood that the directions of the movement of the object images $I_{81}$ and $I_{81}'$ in the image window 20 and the direction of the movement of the cursor 151 can be different from the direction of the movement of the pointer. For example, the directions of the movements of the object images $I_{81}$, $I_{81}'$ and the cursor 151 can be in the reverse direction of the movement of the pointer according to the operation of software. When the processing unit 14 identifies that a plurality of pointers touch the panel surface 100s according to the image window 20 captured by the image sensor 13, the interactive system 10 is operated at the second mode. The processing unit 14 will not calculate the two-dimensional position coordinates of the touch points $T_{81}$ according to the image windows 20. Instead, the processing unit 14 will recognize the gesture according to the relations between the object images of a plurality of pointers and the refresh the display of the display screen 150 of the image display 15, for example, scroll screen, scale object, rotate object, switch display or show menu according to the recognized gesture.

Figure 4A:
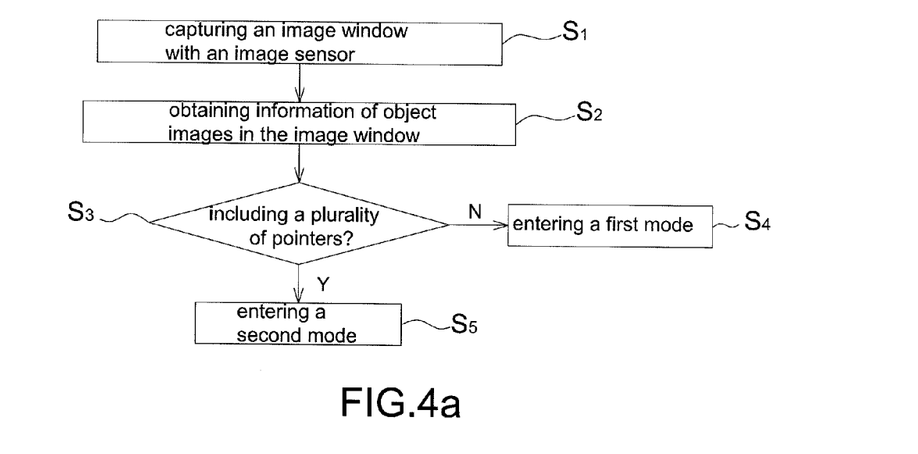
FIG. 4a illustrates a flow chart of the gesture recognition method for the interactive system of the present invention.

Referring to FIG. 4a, it illustrates a flow chart of the gesture recognition method of the present invention. The method of the present invention includes the following steps: capturing an image window with an image sensor (step $S_1$); obtaining the information of a object image in the image window (step $S_2$); identifying whether there is a plurality of pointers present according to the information of the object image (step $S_3$); If not, executing a first mode (step $S_4$); If yes, executing a second mode (step $S_5$).

Figure 4B:
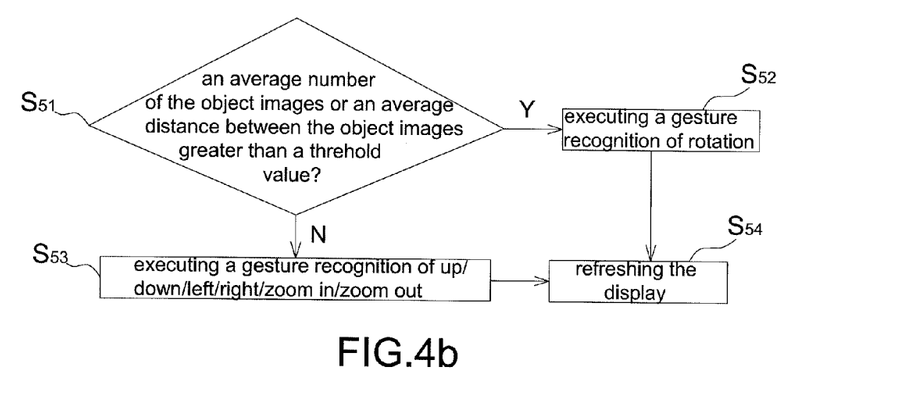

Referring to FIG. 4b, it illustrates a method of executing the second mode in the step $S_5$. The information about the object image includes an average number of the object images, an average distance between the object images and a greatest distance between the object images. The second mode includes the steps of: identifying whether the average number of the object images or the average distance between the object images is greater than a threshold value (step $S_{51}$); If yes, executing a gesture recognition of rotation according to a relation between the object images in the successive image windows (step $S_{52}$); If not, executing a gesture recognition of up/down/left/right/zoom in/zoom out according to relations between the object images in the successive image windows (step $S_{53}$); and refreshing the display of the image display according to the recognized gesture (step $S_{54}$). It will be appreciated that the gesture recognition of rotation can be executed when the average number of the object images and the average distance between the object images is smaller than a threshold value in FIG. 4b and the gesture recognition of translation can be executed when the average number of the object images and the average distance between the object images is greater than a threshold value.

In other embodiments, the second mode can include only one step: performing a gesture recognition of rotation according to a relation between the object images in the successive image windows. In other embodiment, the second mode can include only one step: performing a gesture recognition of up/down/left/right/zoom in/zoom out according to a relation between the object images in the successive image windows. More specifically, the second mode of an interactive system can execute only the gesture recognition of rotation or of up/down/left/right/zoom in/zoom out.

Referring to FIGS. 3a to 4b again, when the gesture recognition is executed by using the interactive system 10 according to the first embodiment of the present invention, the image sensor 13 captures an image to form an image window 20, wherein the image window 20 includes at least one object image $I_{81}$ of the touch point $T_{81}$ on which the pointer touches and at least one object image $I_{81}'$ of the first mirror touch point $T_{81}'$ (step $S_1$). Afterward, the processing unit 14 captures the information of the object images in the image window 20, e.g. the average number of the object images, the average distance between the object images and the greatest distance between the object images for the subsequent steps (step $S_2$). Next, the processing unit 14 identifies whether there is a plurality of pointers found in the image window 20 according to the captured information of the object image (step $S_3$). Because each the pointer will cause at most two object images in the image window 20, it averages that a plurality of pointers are included when more than two object images are present in the image window 20.

When only one pointer is identified, as shown in FIGS. 3a and 3b, the processing unit 14 enables the interactive system 10 to enter a first mode (step $S_4$). At the first mode, the processing unit 14 calculates the two-dimensional position coordinate of the touch point (e.g. $T_{81}$) on the panel surface 100s on which the pointer touches according to one-dimensional positions of the object images (e.g. $I_{81}$ and $I_{81}'$) captured by the image sensor 13 in the image window 20. Afterward, the processing unit 14 relatively controls the motion of the cursor 151 on the image display 15 according to the change of the two-dimensional position coordinates of the touch point.

When the processing unit 14 identifies that there is a plurality of pointers touching the panel surface 100s according to the information of the object images, as illustrated in the steps 5a-5h, the processing unit 14 enables the interactive system 10 to enter a second mode (step $S_5$). At the second mode, the processing unit 14 executes a gesture recognition according to relations between the object images in the image window 20 and then refreshes the display of the display screen 150 of the image display 15, for example, scroll screen, scale object, rotate object, switch display or show menu according to the recognized gesture.

Referring to FIGS. 5a to 5h, the embodiment of the second mode will be described in the following paragraphs. The light-emitting unit 11 is a passive light source in the embodiment. In addition, the FIGS. 5a to 5h is only exemplary and do not restrict the present invention.

Gesture for Scrolling Screen

Referring to FIGS. 5a to 5d, when the processing unit 14 identifies that there is a plurality of touch points, for example, $T_1$ and $T_2$ present according to the information of the object images in a captured image window 20, the second mode is entered. Afterward, the processing unit 14 identifies whether the average number of the object images in the image window 20 is greater than a threshold value, said six (6), or whether the average distance Say between the object images is greater than a predetermined threshold vale (step $S_{51}$). When both the average number of the object images and the average distance Say are not greater than a predetermined threshold value, a gesture recognition of translation is executed (step $S_{53}$).

When executing the gesture recognition of translation, the object images are first grouped. For example, the object images can be divided into a first image group $G_1$ and a second image group $G_2$ by the central line C of the image window 20, wherein the first image group $G_1$ can be a real-image group or imaginary-image group, and the second image group $G_2$ can be an imaginary-image group or real-image group.

For example, as shown in FIGS. 5a to 5d, both the average number of the object images and the average distance Say between the object images are not greater than the predetermined threshold values, the processing unit 14 executes the gesture recognition of up/down/left/right (step $S_{53}$). For example, in FIG. 5a, the processing unit 14 identifies that the first image group $G_1$ and second image group $G_2$ in the image window 20 all move rightward. It is therefore identified that the user is making the gesture of scrolling screen rightward/leftward. The processing unit 14 then correspondingly refreshes the display of the display screen 150 of the image display 15 (step $S_{54}$).

Figure 5A:
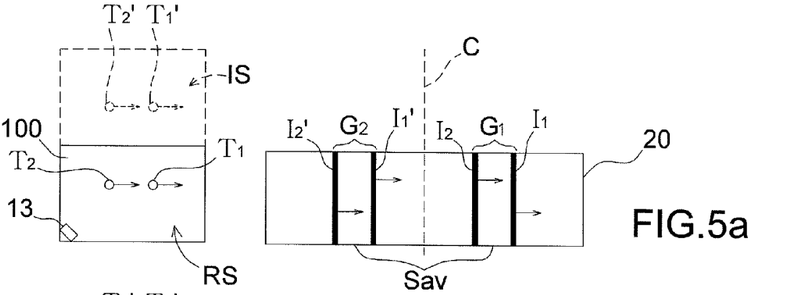
FIGS. 5a to 5d are schematic views of recognizing right/left/down/up gestures respectively according to the gesture recognition method for the interactive system of the first embodiment of the present invention.
Figure 5B:
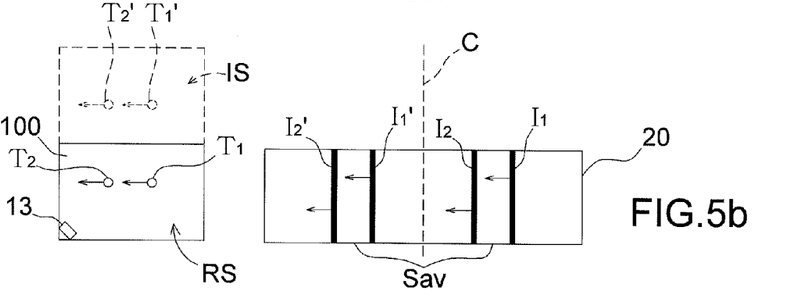

Similarly, in FIG. 5b, the processing unit 14 identifies that the first image group $G_1$ and second image group $G_2$ in the image window 20 all move leftward. It is therefore identified that the user is making the gesture of scrolling screen leftward/rightward. The processing unit 14 then correspondingly refreshes the display of the display screen 150 of the image display 15 (step $S_{54}$).

Figure 5C:
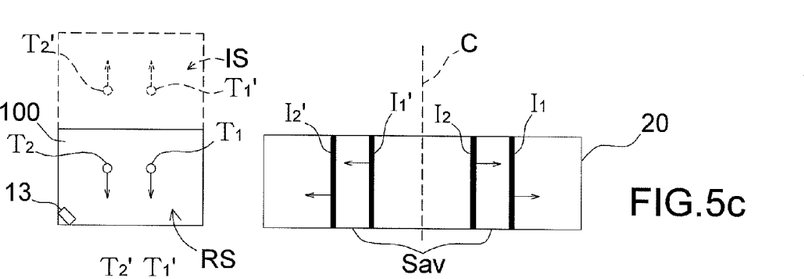

In FIG. 5c, the processing unit 14 identifies that the average distance between the first image group $G_1$ and second image group $G_2$ gradually increases. It is therefore identified that the user is making the gesture of scrolling screen downward/upward. The processing unit 14 then correspondingly refreshes the display of the display screen 150 of the image display 15 (step $S_{54}$).

Figure 5D:
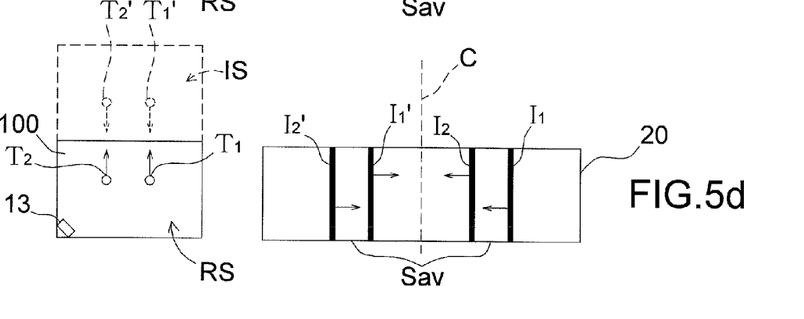

In FIG. 5d, the processing unit 14 identifies that the average distance between the first image group $G_1$ and second image group $G_2$ gradually decreases. It is therefore identified that the user is making the gesture of scrolling screen upward/downward. The processing unit 14 then correspondingly refreshes the display of the display screen 150 of the image display 15 (step $S_{54}$).

In another embodiment, when the processing unit 14 identifies that there is a plurality of touch points present according to the information of the object images in a captured image window 20, the step $S_{51}$ will not be executed and the gesture recognition of translation (step $S_{53}$) will be executed directly.

Gesture for Scaling Object

Figure 5E:
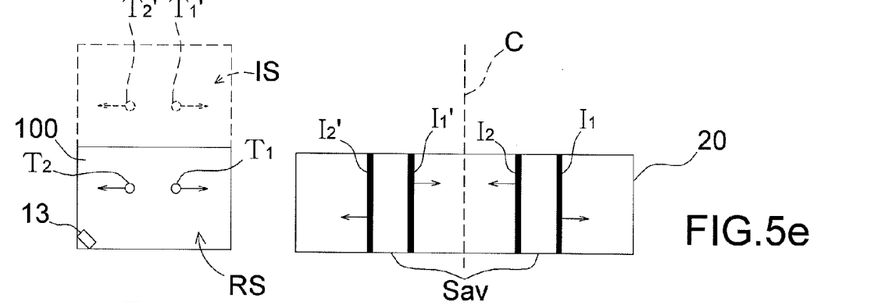
FIGS. 5e to 5f are schematic views of recognizing zoom in/zoom out gestures respectively according to the gesture recognition method for the interactive system of the first embodiment of the present invention.
Figures 5F, 5G:
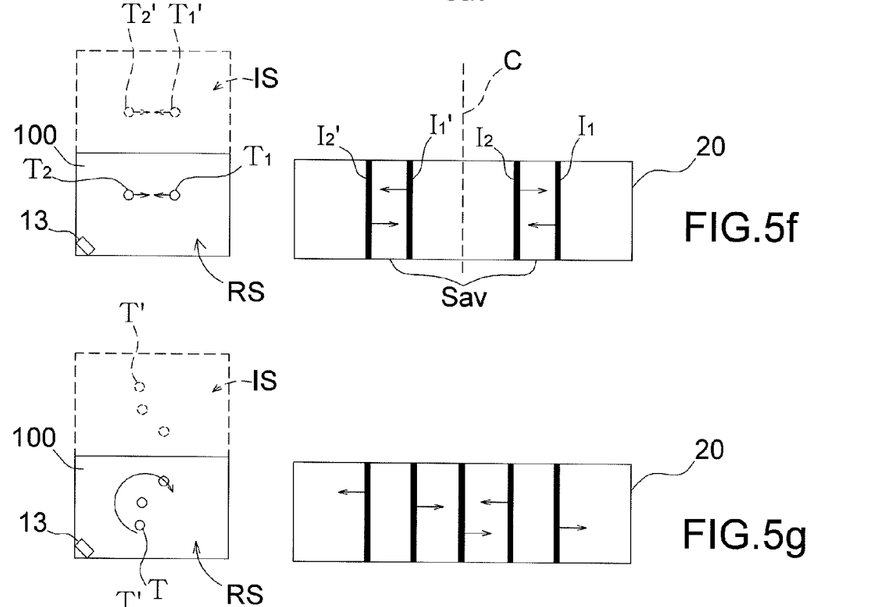
FIGS. 5g to 5h are schematic views of recognizing clockwise/counterclockwise rotation gestures respectively according to the gesture recognition method for the interactive system of the first embodiment of the present invention.

Before desiring to execute the scaling object, a user is required to touch the panel surface 100s first to form a single touch point on the panel surface 100s so as to enter the first mode and then move the cursor 151 to a target object O, as shown in FIG. 3a. Afterward, the user forms a plurality of touch points on the panel surface 100s as shown in FIGS. 5e to 5f. When the processing unit 14 identifies that there is a plurality of touch points, for example, $T_1$ and $T_2$ present according to the information of the object images in a captured image window 20, the second mode is entered.

Afterward, the processing unit 14 identifies whether the average number of the object images in the image window 20 or the average distance Say between the object images is greater than a predetermined threshold vale (step $S_{51}$). When both the average number of the object images and the average distance Say are not greater than a predetermined threshold value, the object images are first grouped. For example, the object images can be divided into a first image group $G_1$ and a second image group $G_2$ by the central line C of the image window 20

For example, as shown in FIGS. 5e to 5f, both the average number of the object images and the average distance Say between the object images are not greater than the predetermined threshold values, the processing unit 14 executes the gesture recognition of zoom in/zoom out (step $S_{53}$). For example, in FIG. 5e, the processing unit 14 identifies that the average distance between the first image group $G_1$ and second image group $G_2$ in the image window 20 keeps substantially unchanged and the greatest distance between the object images increases. It is therefore identified that the user is making the gesture of zoom in/zoom out. The processing unit 14 then correspondingly refreshes the display of the display screen 150 of the image display 15 (step $S_{54}$).

For example, as shown in FIG. 5f, the processing unit 14 identifies that the average distance between the first image group $G_1$ and second image group $G_2$ in the image window 20 keeps substantially unchanged and the greatest distance between the object images decreases. It is therefore identified that the user is making the gesture of zoom out/zoom in. The processing unit 14 then correspondingly refreshes the display of the display screen 150 of the image display 15 (step $S_{54}$).

In another embodiment, when the processing unit 14 identifies that there is a plurality of touch points present according to the information of the object images in a captured image window 20, the step $S_{51}$ will not be executed and the gesture recognition of zoom in/zoom out (step $S_{53}$) will be executed directly.

In addition, when desiring to execute the scaling object, it is not always required to enter the first mode first before entering the second mode. For example, when the panel 100 is a touch panel, a user can directly highlight the target object. Therefore, before desiring to execute the scaling object, a user can enter the second mode directly.

Gesture for Rotating Object

Figure 5H:
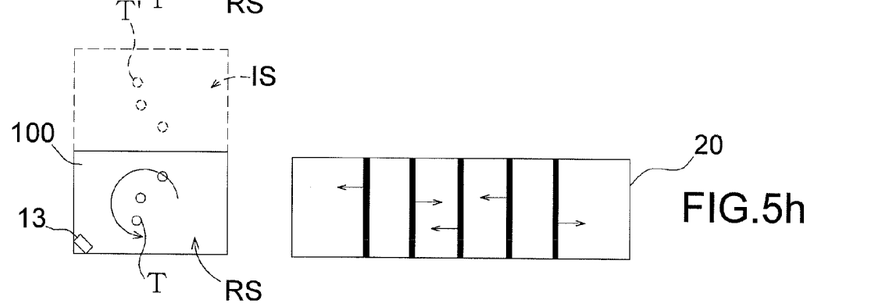

Before desiring to execute the rotating object, a user is required to touch the panel surface 100s first to form a single touch point on the panel surface 100s so as to enter the first mode and then move the cursor 151 to a target object O, as shown in FIG. 3a. Afterward, the user forms a plurality of touch points T on the panel surface 100s as shown in FIGS. 5g to 5h. When the processing unit 14 identifies that there is a plurality of touch points T present according to the information of the object images in a captured image window 20, the second mode is entered.

Afterward, the processing unit 14 identifies whether the average number of the object images in the image window 20 or the average distance Say between the object images is greater than a predetermined threshold vale (step $S_{51}$). When the average number of the object images or the average distance Say is greater than a predetermined threshold value, the object images are not grouped. The orientation of rotation can be identified by comparing the numbers of the object images moving toward two opposing sides of the image window 20.

For example, as shown in FIG. 5g, the processing unit 14 identifies that the number of the object images moving rightward in the image window 20 is greater than that of the object image moving leftward. It is therefore identified that the user is making the gesture of rotating clockwise/counterclockwise. The processing unit 14 then correspondingly refreshes the display of the display screen 150 of the image display 15 (step $S_{54}$).

For example, as shown in FIG. 5h, the processing unit 14 identifies that the number of the object images moving leftward in the image window 20 is greater than that of the object image moving rightward. It is therefore identified that the user is making the gesture of rotating counterclockwise/clockwise. The processing unit 14 then correspondingly refreshes the display of the display screen 150 of the image display 15 (step $S_{54}$).

In another embodiment, when the processing unit 14 identifies that there is a plurality of touch points present according to the information of the object images in a captured image window 20, the step $S_{51}$ will not be executed and the gesture recognition of rotating object (step $S_{52}$) will be executed directly.

In addition, when desiring to execute the rotating object, it is not always required to enter the first mode first before entering the second mode. For example, when the panel 100 is a touch panel, a user can directly highlight the target object. Therefore, before desiring to execute the rotating object, a user can enter the second mode directly.

Gesture for Switching Display

The user touches the panel surface 100s to form a plurality of touch points T on the panel surface 100s, as shown in FIGS. 5g to 5h. When the processing unit 14 identifies that there is a plurality of touch points T present according to the information of the object images in a captured image window 20, the second mode is entered.

The processing unit 14 compares the numbers of the object images moving toward two opposing sides of the image window 20 to determine whether to switch display. As shown in FIGS. 5g and 5h, the processing unit 14 identifies that the numbers of the object images moving rightward/leftward in the image window 20 is greater than the numbers of the object image moving leftward/rightward, respectively. It is therefore identified that the user is making the gesture of switch display. The processing unit 14 then correspondingly switches display of the image display 15.

Gesture for Showing Menu

The user touches the panel surface 100s to form a plurality of touch points T on the panel surface 100s, as shown in FIGS. 5g to 5h. When the processing unit 14 identifies that there is a plurality of touch points T present according to the information of the object images in a captured image window 20, the second mode is entered.

The processing unit 14 compares the numbers of the object images moving toward two opposing sides of the image window 20 to determine whether to show menu. As shown in FIGS. 5g and 5h, the processing unit 14 identifies that the numbers of the object images moving rightward/leftward in the image window 20 is greater than the numbers of the object image moving leftward/rightward, respectively. It is therefore identified that the user is making the gesture of showing menu. The processing unit 14 then correspondingly shows a menu on the display screen 150 of the image display 15.

Second Embodiment

Figure 6A:
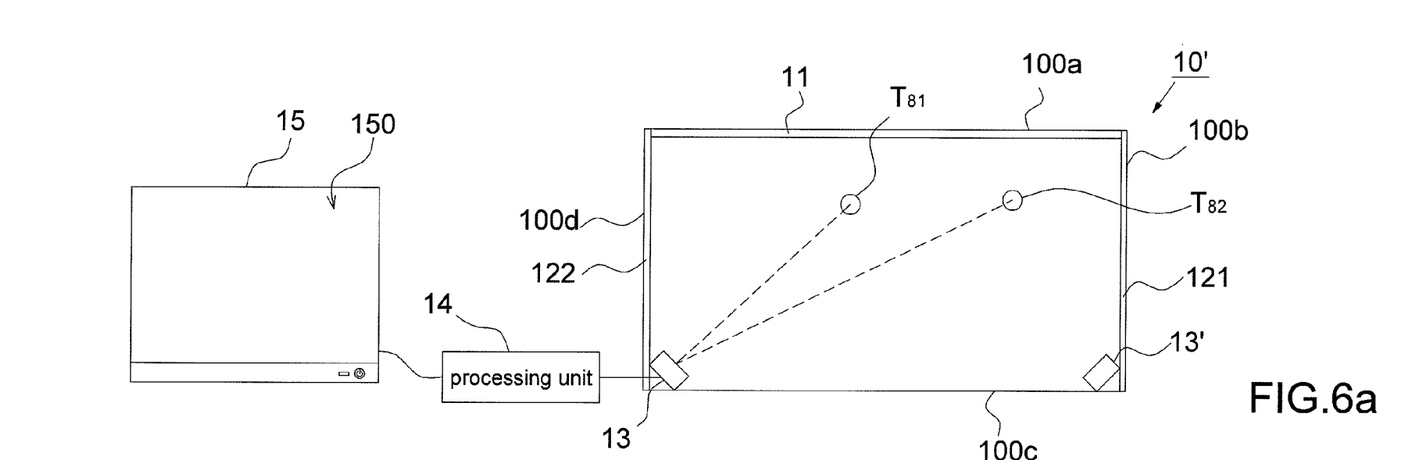
FIG. 6a is an operational schematic view of the interactive system according to the second embodiment of the present invention.
Figure 6B:
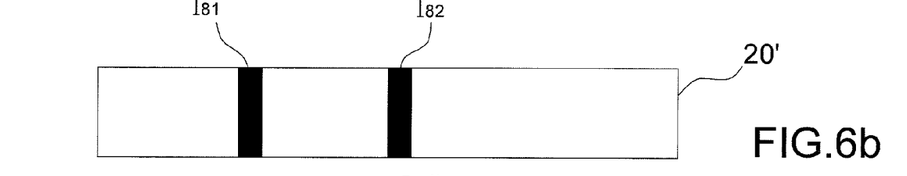
Figure 6C:
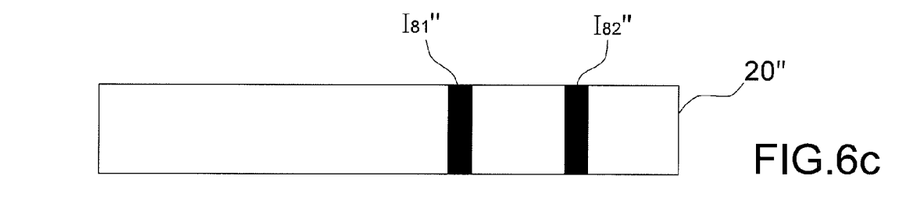

Referring to FIGS. 6a to 6c, wherein FIG. 6a is a schematic view illustrating how to operate the interactive system 10' according to the second embodiment of the present invention and FIGS. 6b and 6c are schematic views of image windows 20' and 20" captured by the image sensors 13 and 13' respectively in FIG. 6a. In this embodiment, the interactive system 10' includes a light-emitting unit 11, a first light source 121, a second light source 122 and image sensors 13, 13'. The light-emitting unit 11 is an active light source and preferably emits light toward the third side 100c of the panel. The light-emitting unit 11, first light source 121 and second light source 122 are disposed on the surface of the panel and adjacent to the first side 100a, second side 100b and fourth side 100d of the panel, respectively. Therefore, the image window 20' captured by the image sensor 13 comprises only the object images $I_{81}$ and $I_{82}$ of the tips of pointers, and the image window 20" captured by the image sensor 13' comprises only the object images $I_{81}"$ and $I_{82}"$ of the tips of the pointers.

In this embodiment, the processing unit 14 can make gesture recognition according to the relations between a plurality of object images of the pointers in the image windows 20' and 20" captured by the image sensors 13 and 13'.

Gesture for Scrolling Screen

Figure 7A:
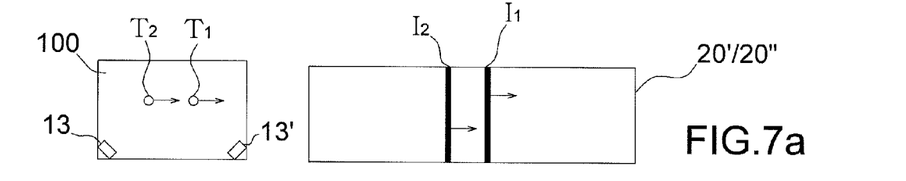
FIGS. 7a to 7b are schematic views of recognizing right/left gestures respectively according to the gesture recognition method for the interactive system of the second embodiment of the present invention.
Figure 7B:
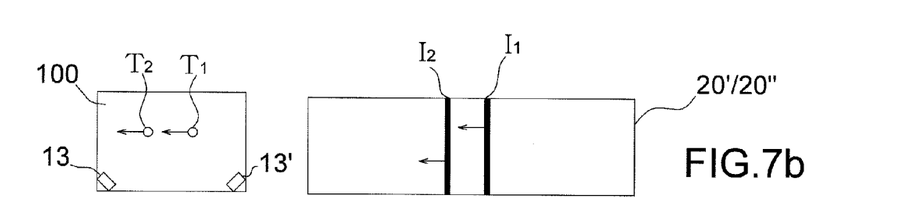

Referring to FIGS. 7a to 7b, when the processing unit 14 identifies that there is a plurality of touch points, for example, $T_1$ and $T_2$ present according to the information of the object images in the image windows 20' and 20" captured by the image sensors 13 and 13', the second mode is entered. Afterward, the processing unit 14 identifies whether the average number of the object images in the image windows 20', 20" or the average distance between the object images is greater than a predetermined threshold vale (step $S_{51}$).

When both the average number of the object images and the average distance between the object images in the image windows 20' and 20" are not greater than the predetermined threshold value, the processing unit 14 makes gesture recognition of left/right (step $S_{53}$). For example, in FIGS. 7a and 7b, the processing unit 14 identifies that the object images in the image windows 20' and 20" all move rightward or leftward. It is therefore identified that the user is making the gesture of scrolling screen downward/upward. The processing unit 14 then correspondingly refreshes the display of the display screen 150 of the image display 15 (step $S_{54}$).

In another embodiment, when the processing unit 14 identifies that there is a plurality of touch points present according to the information of the object images in the captured image windows 20' and 20", the step $S_{51}$ will not be executed and the gesture recognition of translation (step $S_{53}$) will be executed directly.

Gesture for Scaling Object

Figure 7C:
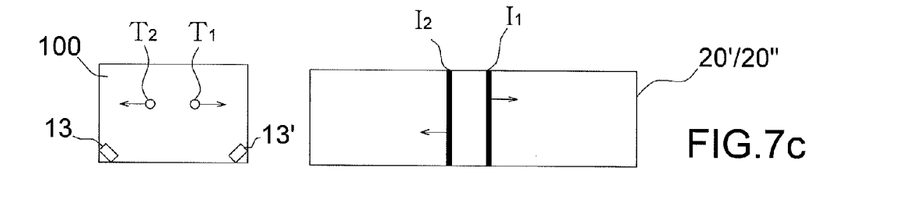
FIGS. 7c to 7d are schematic views of recognizing zoom in/zoom out gestures respectively according to the gesture recognition method for the interactive system of the second embodiment of the present invention.
Figure 7D:
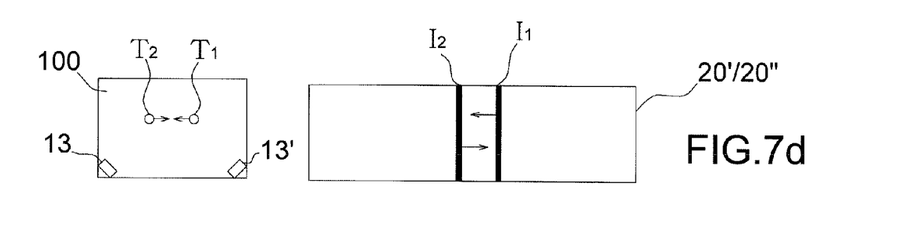

Before desiring to execute the scaling object, a user is required to first move a cursor 151 to a target object. Afterward, the user forms a plurality of touch points, for example, $T_1$ and $T_2$ on the panel surface 100s as shown in FIGS. 7c to 7d. When the processing unit 14 identifies that there is a plurality of touch points present according to the information of the object images in the image windows 20' and 20" captured by the image sensors 13 and 13', the second mode is entered.

Afterward, the processing unit 14 identifies whether the average number of the object images in the image windows 20', 20" or the average distance between the object images is greater than a predetermined threshold vale (step $S_{51}$). When both the average number of the object images and the average distance between the object images in the image windows 20' and 20" are not greater than the predetermined threshold value, the processing unit 14 makes gesture recognition of zoom in/zoom out (step $S_{53}$). For example, in FIGS. 7c and 7d, the processing unit 14 identifies that the average distance between the object images in the image windows 20' and 20" increases or decreases. It is therefore identified that the user is making the gesture of zoom in/zoom out. The processing unit 14 then correspondingly refreshes the display of the display screen 150 of the image display 15 (step $S_{54}$).

In another embodiment, when the processing unit 14 identifies that there is a plurality of touch points present according to the information of the object images in the captured image windows 20' and 20", the step $S_{51}$ will not be executed and the gesture recognition of zoom in/zoom out (step $S_{53}$) will be executed directly.

In addition, when desiring to execute the scaling object, it is not always required to enter the first mode first before entering the second mode. For example, when the panel 100 is a touch panel, a user can directly highlight the target object. Therefore, before desiring to execute the scaling object, a user can enter the second mode directly.

Gesture for Rotating Object

Figure 7E:
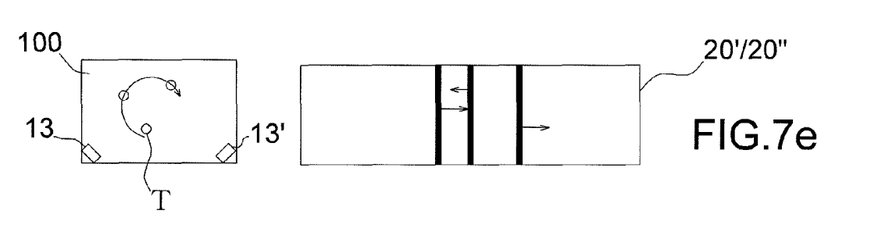
FIGS. 7e to 7f are schematic views of recognizing clockwise/counterclockwise rotation gestures respectively according to the gesture recognition method for the interactive system of the second embodiment of the present invention.
Figure 7F:
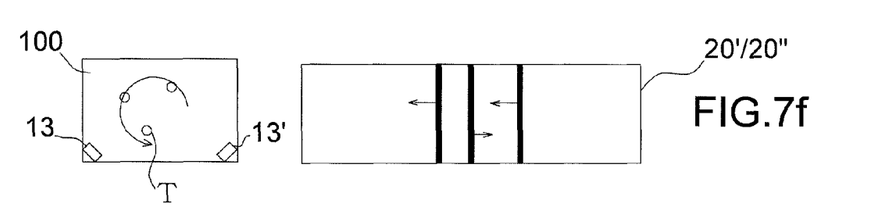

Before desiring to execute the rotating object, a user is required to first move a cursor 151 to a target object. Afterward, the user forms a plurality of touch points T on the panel surface 100s as shown in FIGS. 7e to 7f. When the processing unit 14 identifies that there is a plurality of touch points T present according to the information of the object images in the image windows 20' and 20" captured by the image sensors 13 and 13', the second mode is entered.

Afterward, the processing unit 14 identifies whether the average number of the object images in the image windows 20', 20" or the average distance between the object images is greater than a predetermined threshold vale (step $S_{51}$). When the average number of the object images or the average distance is greater than a predetermined threshold value, the orientation of rotation can be identified by comparing the numbers of the object images moving toward two opposing sides of the image windows 20' and 20".

For example, as shown in FIGS. 7e and 7f, the processing unit 14 identifies that the number of the object images moving rightward and leftward in the image windows 20', 20" is greater than that of the object image moving leftward and rightward, respectively. It is therefore identified that the user is making the gesture of rotating clockwise/counterclockwise. The processing unit 14 then correspondingly refreshes the display of the display screen 150 of the image display 15 (step $S_{54}$).

In another embodiment, when the processing unit 14 identifies that there is a plurality of touch points present according to the information of the object images in the captured image windows 20' and 20", the step $S_{51}$ will not be executed and the gesture recognition of rotation (step $S_{52}$) will be executed directly.

In addition, when desiring to execute the rotating object, it is not always required to enter the first mode first before entering the second mode.

Gesture for Switching Display or Showing Menu

The user touches the panel surface 100s to form a plurality of touch points T on the panel surface 100s, as shown in FIGS. 7e to 7f.

When the processing unit 14 identifies that there is a plurality of touch points T present according to the information of the object images in the image windows 20' and 20" captured by the image sensors 13 and 13', the second mode is entered.

The processing unit 14 compares the numbers of the object images moving toward two opposing sides of the image windows 20' and 20" to determine whether to switch display or show menu. As shown in FIGS. 7e and 7f, the processing unit 14 identifies that the number of the object images moving rightward and leftward in the image windows 20', 20" is greater than that of the object image moving leftward and rightward, respectively. It is therefore identified that the user is making the gesture of switching display or showing menu. The processing unit 14 then correspondingly refreshes the display of the display screen 150 of the image display 15 (step $S_{54}$).

It will be appreciated that the actions corresponding to the relation between the object images in the second mode are not limited to the embodiments illustrated in FIGS. 5a to 5h and 7a to 7f. The spirit of the present invention is that the gesture recognitions can be made simply according to the relations between the object images in the captured image windows and therefore there is no need to know exact positions of the touch points on the panel surface. This can solve the prior-art problem that the positions of the touch points cannot be figured out due to the hiding of the pointers between each other.

As described above, the conventional touch system makes gesture recognitions according to the change of the two-dimensional position coordinates of the touch points. Therefore, when the pointers occlude each other, the exact positions of the touch points can not be obtained exactly. The present invention is to identify the relations between the object images in an image window to make gesture recognitions. Therefore, the gesture recognitions can be made by using only one image sensor. The cost of the system can be reduced accordingly.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A gesture recognition method for an interactive system, the interactive system comprising at least one light source, a reflector, and an image sensor configured to capture an image window comprising object images of at least one pointer caused by the pointer occluding light emitted from the at least one light source or the reflector, the gesture recognition method comprising:
    capturing the image window with the image sensor;
    obtaining information of the object images in the image window, wherein the information of the object images comprises an average number of the object images, an average distance between the object images, and a greatest distance between the object images;
    determining whether there is a plurality of pointers according to the information of the object images; and
    executing, when it is determined that there is a plurality of pointers, a gesture recognition according to a relation between the object images in successive image windows.

2. The gesture recognition method as claimed in claim 1, further comprising:
    calculating, when it is determined that there is a single pointer, position coordinates of the pointer relative to the interactive system according to a position of the object image in the image window; and
    controlling a motion of a cursor on an image display according to a change of the position coordinates of the pointer in the successive image windows.

3. The gesture recognition method as claimed in claim 1, wherein the executing comprises:
    comparing the average number of the object images and the average distance between the object images with a threshold value;
    executing a gesture recognition of up, down, left, right, zoom in, or zoom out when the average number of the object images and the average distance between the object images are not greater than the threshold value;
    executing a gesture recognition of rotation when the average number of the object images or the average distance between the object images is greater than the threshold value; and
    refreshing a display of the image display according to the recognized gesture.

4. The gesture recognition method as claimed in claim 3, wherein the refreshing includes any one selected from the group consisting of scrolling a screen, scaling an object, rotating an object, switching a display, and showing a menu.

5. The gesture recognition method as claimed in claim 3, wherein when the average number of the object images and the average distance between the object images are not greater than the threshold value, the gesture recognition method further comprises: dividing the object images into two groups.

6. The gesture recognition method as claimed in claim 5, wherein the object images are divided into a real-image group and an imaginary-image group.

7. The gesture recognition method as claimed in claim 5, further comprising:

executing a gesture recognition of left or right when both the two groups of the object images move in the same direction in the image window;

executing a gesture recognition of up or down when the average distance between the two groups of the object images changes; and executing a gesture recognition of zoom in or zoom out when the greatest distance between the object images in the image window changes.

8. The gesture recognition method as claimed in claim 3, wherein the executing a gesture recognition of rotation comprises:

identifying a direction along which a majority of the object images move to recognize the orientation of rotation.

9. The gesture recognition method as claimed in claim 1, wherein the executing comprises recognizing up, down, left, right, zoom in, or zoom out.

10. The gesture recognition method as claimed in claim 1, wherein the executing comprises recognizing a rotation.

11. A gesture recognition method for an interactive system, the interactive system comprising a light-emitting unit and an image sensor configured to capture an image window comprising object images of a plurality of pointers caused by the pointers occluding light emitting from the light-emitting unit, the gesture recognition method comprising:

capturing image windows with the image sensor; and executing a gesture recognition according to relations between a plurality of object images in successive image windows, wherein the relations between the object images comprise a change of an average distance between the object images, a change of a greatest distance between the object images, and a direction of displacement.

12. The gesture recognition method as claimed in claim 11, wherein the light-emitting unit is a passive light source having a reflecting surface, the image windows captured by the image sensor comprise real object images and imaginary object images, and the relations between the object images comprise a change of an average distance between the real and imaginary object images, a change of a greatest distance between the real and imaginary object images, and a direction of displacement.

13. The gesture recognition method as claimed in claim 12, further comprising:

dividing the object images into a real-image group and an imaginary-image group.

14. The gesture recognition method as claimed in claim 11, further comprising:

refreshing a display of an image display according to the recognized gesture.

* * * * *